US008208783B2

(12) United States Patent
Owada

(10) Patent No.: US 8,208,783 B2
(45) Date of Patent: Jun. 26, 2012

(54) IMAGE PROCESSING APPARATUS AND IMAGE PROCESSING METHOD

(75) Inventor: Mitsuru Owada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1041 days.

(21) Appl. No.: 11/151,992

(22) Filed: Jun. 14, 2005

(65) Prior Publication Data

US 2005/0286870 A1    Dec. 29, 2005

(30) Foreign Application Priority Data

Jun. 24, 2004   (JP) .................................. 2004-185977

(51) Int. Cl.
*H04N 5/765* (2006.01)
*H04N 5/931* (2006.01)

(52) U.S. Cl. ........................................ 386/200; 386/204

(58) Field of Classification Search ..................... 386/46
See application file for complete search history.

(56) References Cited

U.S. PATENT DOCUMENTS

| 5,056,154 | A | 10/1991 | Aono et al. | |
| 5,224,178 | A * | 6/1993 | Madden et al. | 382/166 |
| 6,771,319 | B2 * | 8/2004 | Konuma | 348/584 |
| 6,950,520 | B1 * | 9/2005 | Ryan et al. | 380/200 |
| 7,508,421 | B2 * | 3/2009 | Tamaru et al. | 348/229.1 |
| 2002/0036697 | A1 * | 3/2002 | Mori et al. | 348/229 |
| 2005/0094966 | A1 * | 5/2005 | Elberbaum | 386/46 |
| 2005/0162562 | A1 * | 7/2005 | Nave | 348/678 |

FOREIGN PATENT DOCUMENTS

| JP | 2-126772 A | 5/1990 |
| JP | 10-243261 A | 9/1998 |

* cited by examiner

*Primary Examiner* — William C Vaughn, Jr.
*Assistant Examiner* — Oluwaseun A Adegeye
(74) *Attorney, Agent, or Firm* — Canon U.S.A., Inc. IP Division

(57) ABSTRACT

There is provided an image processing apparatus including a converting unit for converting a level range of an input image signal into a predetermined level range, and an outputting unit for outputting the converted image signal and first identification information which indicates the predetermined level range, the first identification information being correlated with the converted image signal.

7 Claims, 10 Drawing Sheets

| ID | min | max |
|---|---|---|
| 0 | 0 | 255 |
| 1 | 10 | 240 |
| 2 | 15 | 250 |
| ----- | ----- | ----- |

PROCESSING PROCEDURE

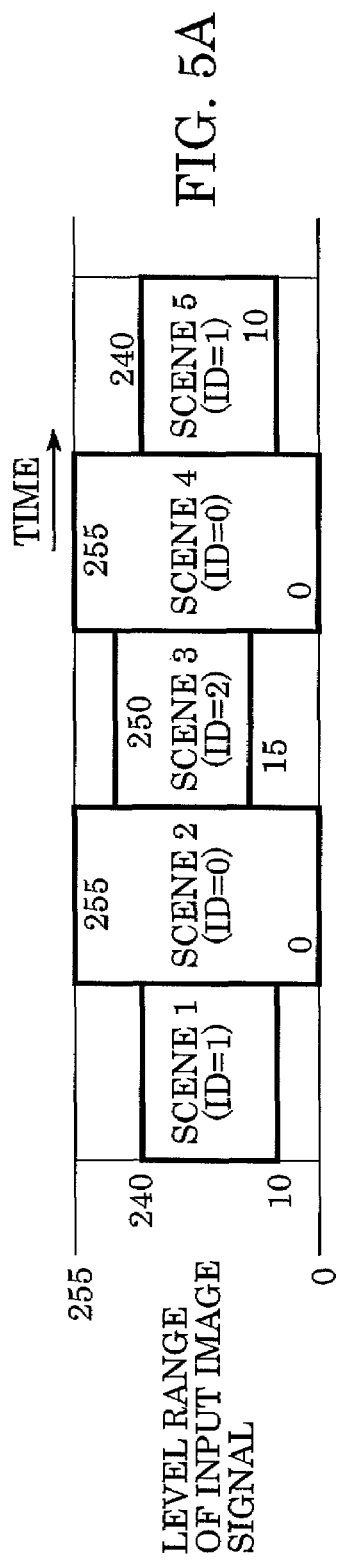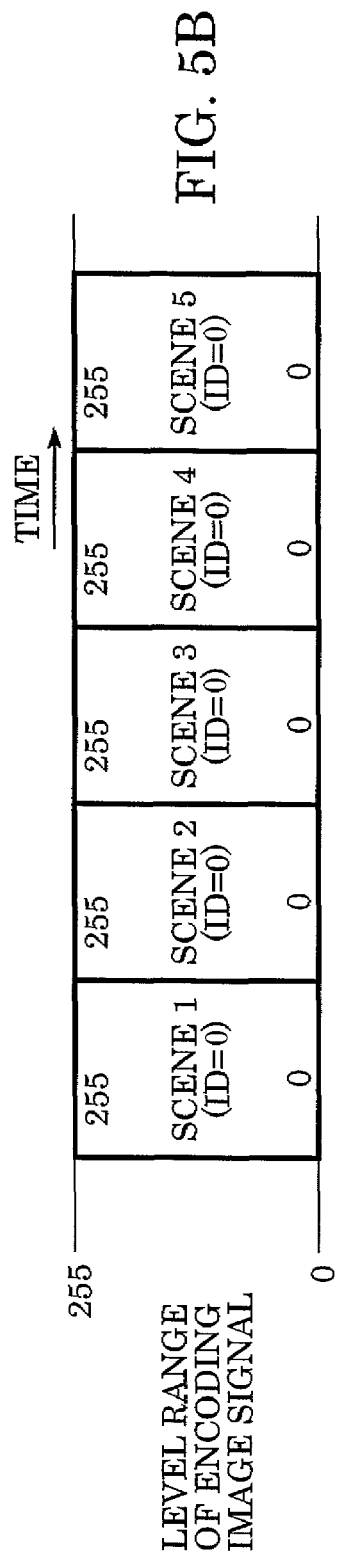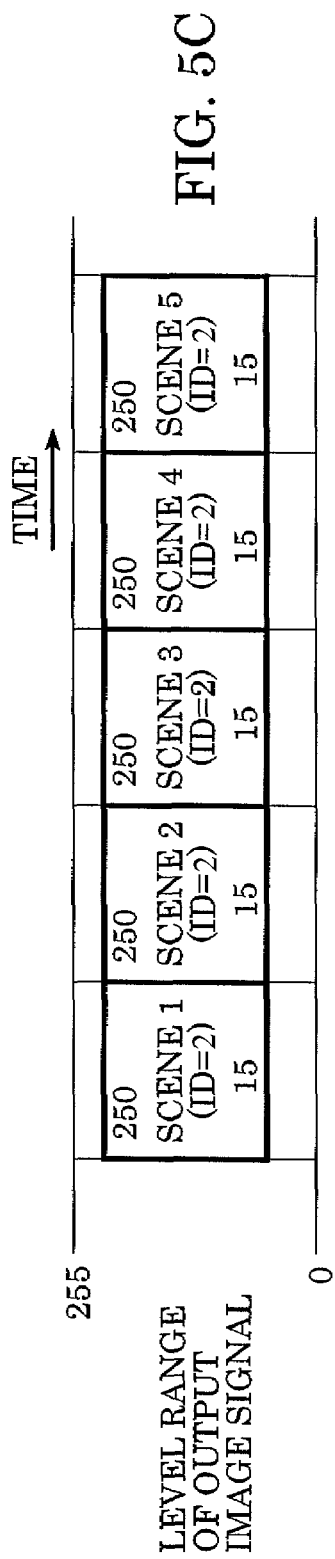

PROCESSING PROCEDURE

IMAGE PROCESSING APPARATUS AND IMAGE PROCESSING METHOD

BACKGROUND OF THE INVENTION

1. Field of the Invention

The present invention relates to digital signal processing for a multiple-valued image signal.

2. Description of the Related Art

In image transmission including a recording and reproducing of image data, the image data is compression-encoded in order to reduce the amount of data. The image data that is compressed-encoded may have a dynamic range that is different.

For example, a digital transmission specification "REC656" is prescribed to use a range of 16-235 in a range of 0-255 using 8-bit image data. That is, in the digital transmission specification, a black level is set to 16 and a white level is set to 235. The 8-bit image data which is not based on this transmission specification has the dynamic range from 0 to 255. Also, an image input apparatus can set up the dynamic range using a manual. The image data which has various dynamic ranges as described above can exist together.

In cases where compression encoding is performed for the image data, without taking the dynamic range of the image data into consideration, image quality deterioration, such as a reduction of contrast and an artifact where should be true black, has occurred by the compression encoding.

The following image processing has been proposed as a method of solving the above-described problem. The density histogram by the pixel value of image data is calculated and the pixel values according to white and black are predicted by the histogram. A dynamic range is determined from the pixel values and the parameter of encoding is set up based on the dynamic range. Since each image does not always have both the white level and the black level in a screen by the above-described method, it is difficult to determine a suitable encoding parameter certainly and stably. The apparatus needs to calculate the density histogram and there is a problem that there are large loads on hardware (such as a memory and a computing element) and software.

Also, in order to correct the difference of the display properties between different display apparatuses, the encoding apparatus which can correct the difference of the dynamic range and gamma characteristics between display apparatuses has been proposed. In the above-described apparatus, the image data with which the dynamic ranges are different cannot be handled simultaneously.

Recently, use of photographing apparatuses that can select still image recording and moving image recording has spread. The dynamic range of image data is different in the still image recording and the moving image recording. If the still image and the moving image are concatenated and edited, the image quality deterioration, such as the reduction of contrast or over-contrast (it means that the image is too bright or too dark), is caused from the difference of the dynamic range. Thus, using the above-described apparatuses and methods, it is difficult to obtain a good quality edit of an image.

SUMMARY OF THE INVENTION

In view of the above problem in the conventional art, the present invention provides an image processing apparatus and an image processing method which makes high quality image processing possible for the image data of any dynamic ranges.

In accordance with an aspect of the present invention, an image processing apparatus includes: a converting unit arranged to convert a level range of an input image signal into a predetermined level range; and an outputting unit arranged to output the converted image signal and first identification information which indicates the predetermined level range, the first identification information being correlated with the converted image signal.

In accordance with another aspect of the present invention, an image processing method includes the following steps: converting a level range of an input image signal into a predetermined level range; and outputting the converted image signal and first identification information which indicates the predetermined level range, the first identification information being correlated with the converted image signal.

Further features and advantages of the present invention will become apparent from the following description of exemplary embodiments (with reference to the attached drawings).

BRIEF DESCRIPTION OF THE DRAWINGS

FIGS. 5A, 5B and 5C illustrate a transition of a level range of an image signal.

DESCRIPTION OF THE EMBODIMENTS

<First Embodiment>

Figures 1, 2:
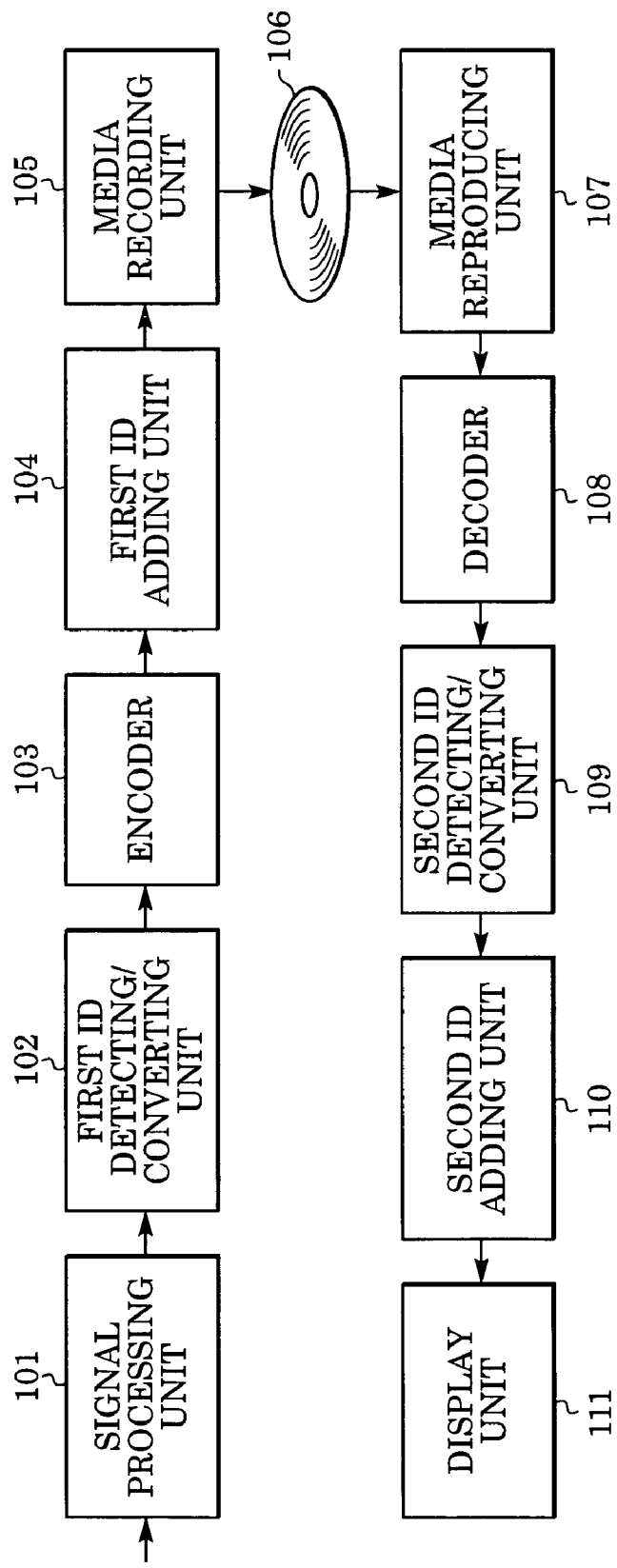
FIG. 1 is a block diagram of an image processing apparatus in a first embodiment of the present invention.
FIG. 2 illustrate illustrates a table of an example of an ID, and a minimum level value and a maximum level value corresponding to the ID.

FIG. 1 is a block diagram of an image processing apparatus in a first embodiment of the present invention.

The image signal which should be recorded on recording medium 106 is input into signal processing unit 101 from an external apparatus. The signal processing unit 101 performs a color conversion and filtering on the image signal. Known general color conversion and filtering techniques can be used and are thus not described herein. The image signal processed by the signal processing unit 101 is input into a first ID detecting/converting unit 102. The first ID detecting/converting unit 102 detects ID information which indicates the level range of the image signal processed by the signal processing unit 101. A level range of the image signal is determined based on the ID information. Then, the level range of the image signal is converted so that it may become the level range corresponding to a coding processing. The image signal which is input into the first ID detecting/converting unit 102 includes the ID information.

FIG. 2 illustrates an exemplary ID information table which includes ID information, and a minimum level value and a maximum level value corresponding to the ID information. In the example shown in FIG. 2, the image signal is expressed by an 8-bit value. Further, in the example shown in FIG. 2: when the ID is 0, the minimum level value is 0 and the maximum level value is 255; when the ID is 1, the minimum level value is 10 and the maximum level value is 240, etc. In this embodiment, the min of a luminance value indicates a black level, and the max of the luminance value indicates a white level. Thus, in this example, when the ID is 1, the black level is 10 and the white level is 240.

Referring again to FIG. 1, the image signal into which a level range was converted by the first ID detecting/converting unit 102 is input into an encoder 103. The encoder 103 encodes the image signal output from the first ID detecting/converting unit 102. A first ID adding unit 104 adds the ID information which indicates the level range converted by the first ID detecting/converting unit 102 to the image signal encoded by the encoder 103. For example, in cases where the first ID detecting/converting unit 102 converts the level range of the image signal into the level range of ID=0 (min=0 and max=255), the first ID adding unit 104 adds the ID information which indicates ID=0, as identification information of the level range, to the image signal encoded by the encoder 103.

A media recording unit 105 processes the image signal (including the ID information), which is output from the first ID adding unit 104, using a recording format corresponding to a recording medium 106 (such as an optical disk), and records the processed image signal on the recording medium 106. That is, the processed image signal including the ID information is recorded on the recording medium.

A reproducing operation is described next. A media reproducing unit 107 reproduces the image signal recorded on the recording medium 106, and outputs the image signal to a decoder 108. The decoder 108 decodes the reproduced image signal. The decoded image signal is input into a second ID detecting/converting unit 109.

The second ID detecting/converting unit 109 detects the ID information which indicates the level range of the decoded image signal and converts, based on the detected ID information, the level range of the decoded image signal into the level range which suits a display unit 111.

The image signal in which the level range is converted by the second ID detecting/converting unit 109 is input into a second ID adding unit 110. The second ID adding unit 110 adds the ID information equivalent to the level range converted by the second ID detecting/converting unit 109 to the image signal, and outputs it to the display unit 111. For example, in cases where the second ID detecting/converting unit 109 converts the level range into the level range of ID=2 (min=15, max=250), the second ID adding unit 110 adds the ID information which indicates the ID=2 to the image signal. Since the image signal of the level range optimized for the display unit 111 is input into the display unit 111, a high quality image is displayed on the display unit 111.

Figure 3:
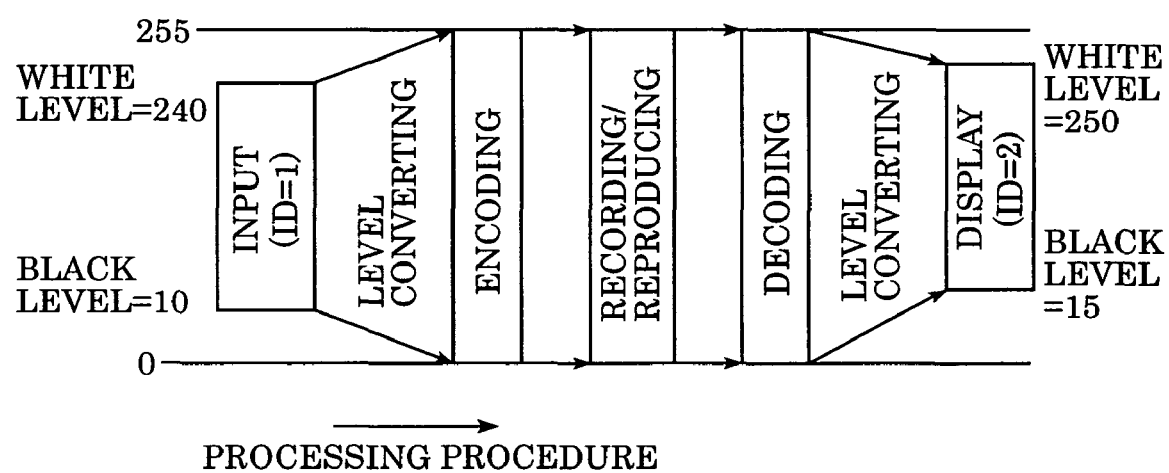
FIG. 3 illustrates a transition of a level range according to a processing procedure in a first embodiment.
Figure 4A:
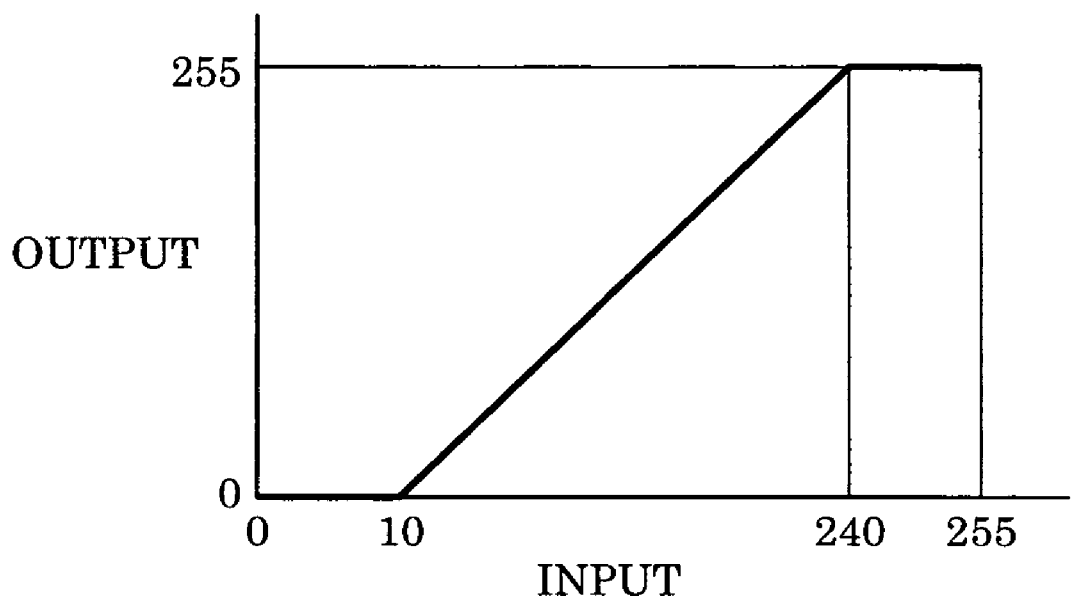
FIGS. 4A and 4B illustrate an example of a conversion characteristic in a first embodiment.
Figure 4B:
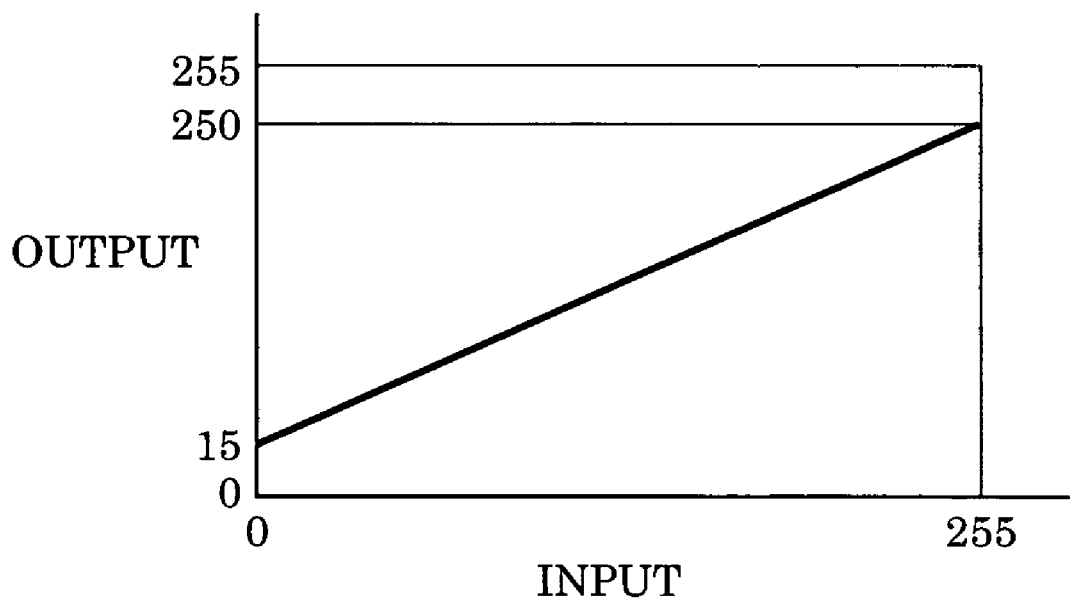

FIG. 3 illustrates a transition of a level range according to a processing procedure in a first embodiment. In this example, the first ID detecting/converting unit 102 converts an input level range of ID=1 (min=10, max=240) into the level range of ID=0 (min=0, max=255). FIG. 4A illustrates an example of the conversion characteristic of the first ID detecting/converting unit 102. The first ID detecting/converting unit 102 converts the input values of 10 to 240 into the values of 0 to 255 according to the conversion characteristic of FIG. 4A, and outputs the converted image signal. The conversion process may be realized, for example, by a look-up table, or by math processing. Processing is then performed with the optimal dynamic range. The processing performed using the optimal dynamic range includes: an encoding process by the encoder 103; a recording/reproducing process by the media recording unit 105, recording medium 106 and the media reproducing unit 107; and a decoding process of the decoder 108. The second ID detecting/converting unit 109 converts the level range of the reproduced image signal into the level range (ID=2, min=15, max=250) of the display unit 111. FIG. 4B illustrates an example of the conversion characteristic of the second ID detecting/converting unit 109. The second ID detecting/converting unit 109 converts the input values of 0 to 255 into the values of 15 to 250 according to the conversion characteristic of FIG. 4B, and outputs the converted image signal. The conversion process may be realized, for example, by a look-up table, or by math processing. By the above processing, the high quality image can be displayed in the display unit 111.

Another effect of this embodiment is explained below using FIGS. 5A, 5B and 5C. FIGS. 5A, 5B and 5C illustrate a transition of the level range of the image signal, in cases where several scenes from which the level range of an image signal is different are concatenated in editing. In FIGS. 5A, 5B and 5C, a horizontal axis illustrates a time-axis and a vertical axis illustrates a level. FIG. 5A illustrates the transition of the level range of an input image signal. FIG. 5B illustrates the transition of the level range of encoding an image signal. FIG. 5C illustrates the transition of the level range of an output image signal.

In FIG. 5A, a scene 1 has ID=1, a scene 2 has ID=0, a scene 3 has ID=2, a scene 4 has ID=0 and a scene 5 has ID=1. In cases where the image signal consists of scenes which have a different level range, such as is shown in FIG. 5, encoding and decoding the image signal as it is causes image quality deterioration, such as the reduction of contrast or over-contrast. In order to prevent the above-mentioned image deterioration problem, before encoding, the level range of the input image signal is converted into a constant range so that the level range of the encoded signal may become constant. Thus, as illustrated in FIG. 5B, the level range becomes the same on each scene, and the encoding process, the recording process, the reproducing process and the decoding process can be performed without causing a difference in the image quality.

After decoding, as illustrated in FIG. 5C, the level range of a decoded image signal is converted according to output equipment (in this embodiment, it is the display unit 111).

An encoding process of the first embodiment is described next with reference to FIG. 6.

Figure 6:
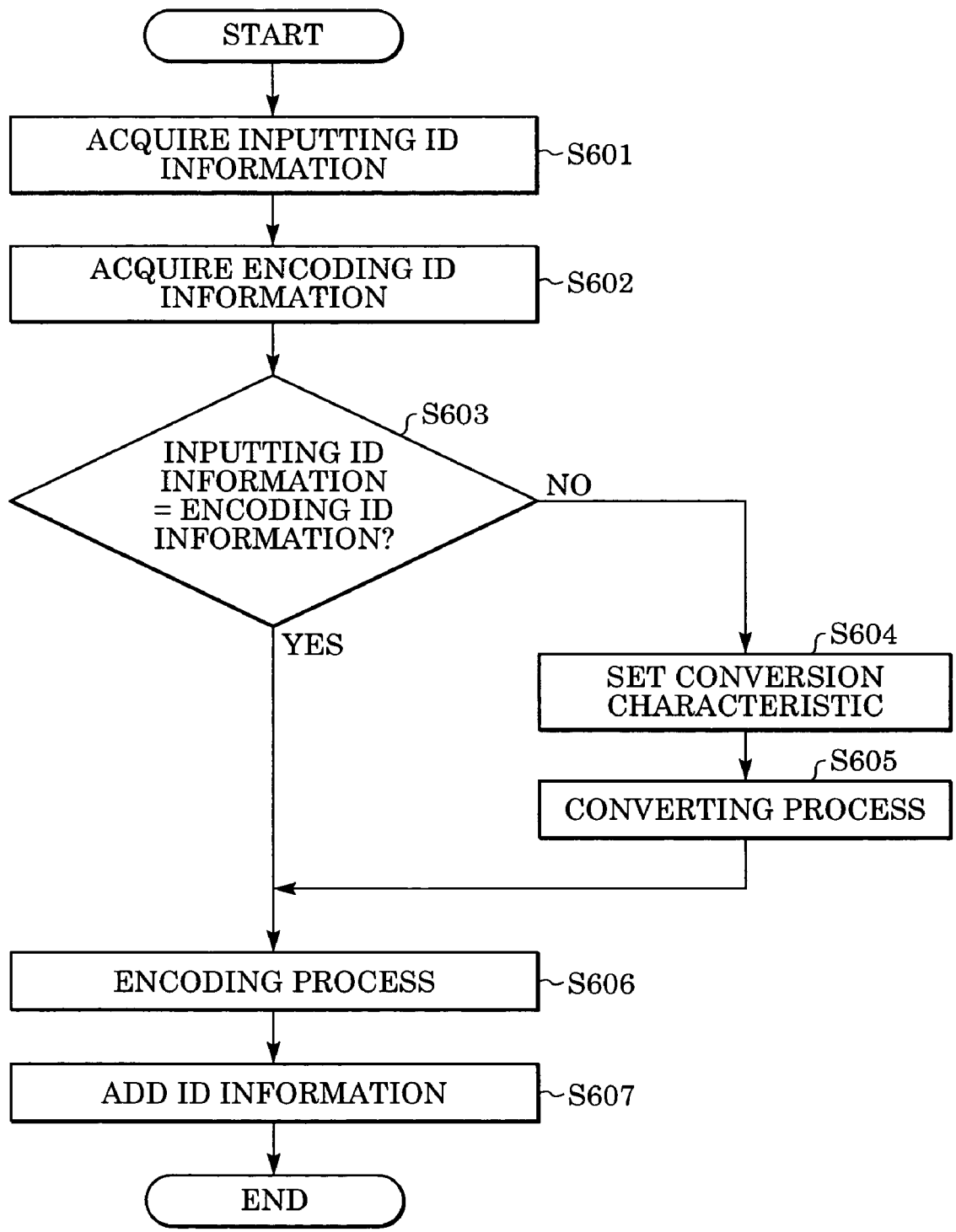
FIG. 6 is a flowchart illustrating a procedure of an encoding process in a first embodiment.

FIG. 6 is a flowchart illustrating a procedure of the encoding process in the first embodiment.

In step S601, the ID information (in the following, referred to as "inputting ID information") which indicates the level range information of the input image signal is acquired by the first ID detecting/converting unit 102, and the processing proceeds to step S602. The ID information is included in a header portion of the input image signal. That is, the ID information has been added to the input image signal. In step S602, the ID information (in the following, referred to as "encoding ID information") which indicates the level range of the image signal when encoding is acquired, and the processing progresses to step S603. The encoding ID information is pre-stored in a work memory (not shown). In step S603, the inputting ID information is compared with the encoding ID information. If the inputting ID information matches the coding ID information (yes in step S603), the processing proceeds to step S606. If the inputting ID information does not match the encoding ID information (no in step S603), the processing proceeds to step S604.

In step S604, the conversion characteristic for converting the level range of the inputting ID information to the level range of the encoding ID information is set, and the processing proceeds to step S605. The conversion characteristic may be set by a look-up table, or by math processing. In the case of a look-up table, the look-up table should be pre-stored in the work memory. In step S605, a converting process of the level range of the inputting image signal is performed according to the conversion characteristic set in step S604, and the processing proceeds to step S606. The level range of the image signal of all scenes turns into the level range corresponding to the encoding process in step S605 (see FIG. 5B).

In step S606, the converted image signal is encoded by a predetermined compression-encoding method (e.g., MPEG (Moving Picture Experts Group)-2, Motion JPEG (Joint Photographic Coding Experts Group) etc.), and the processing proceeds to step S607. In step S607, as for the encoded image signal, the ID information (in the following, referred to as "decoding ID information" is the same information as the encoding ID information) is added to the header portion of the encoded image signal, and the processing then ends. That is, in step S607, the encoded image signal is output in correlation with the decoding ID information.

Thus, according to the above-described processing, it is possible to perform a high quality encoding process, without causing image quality deterioration.

A decoding process of the first embodiment is described next with reference to FIG. 7.

Figure 7:
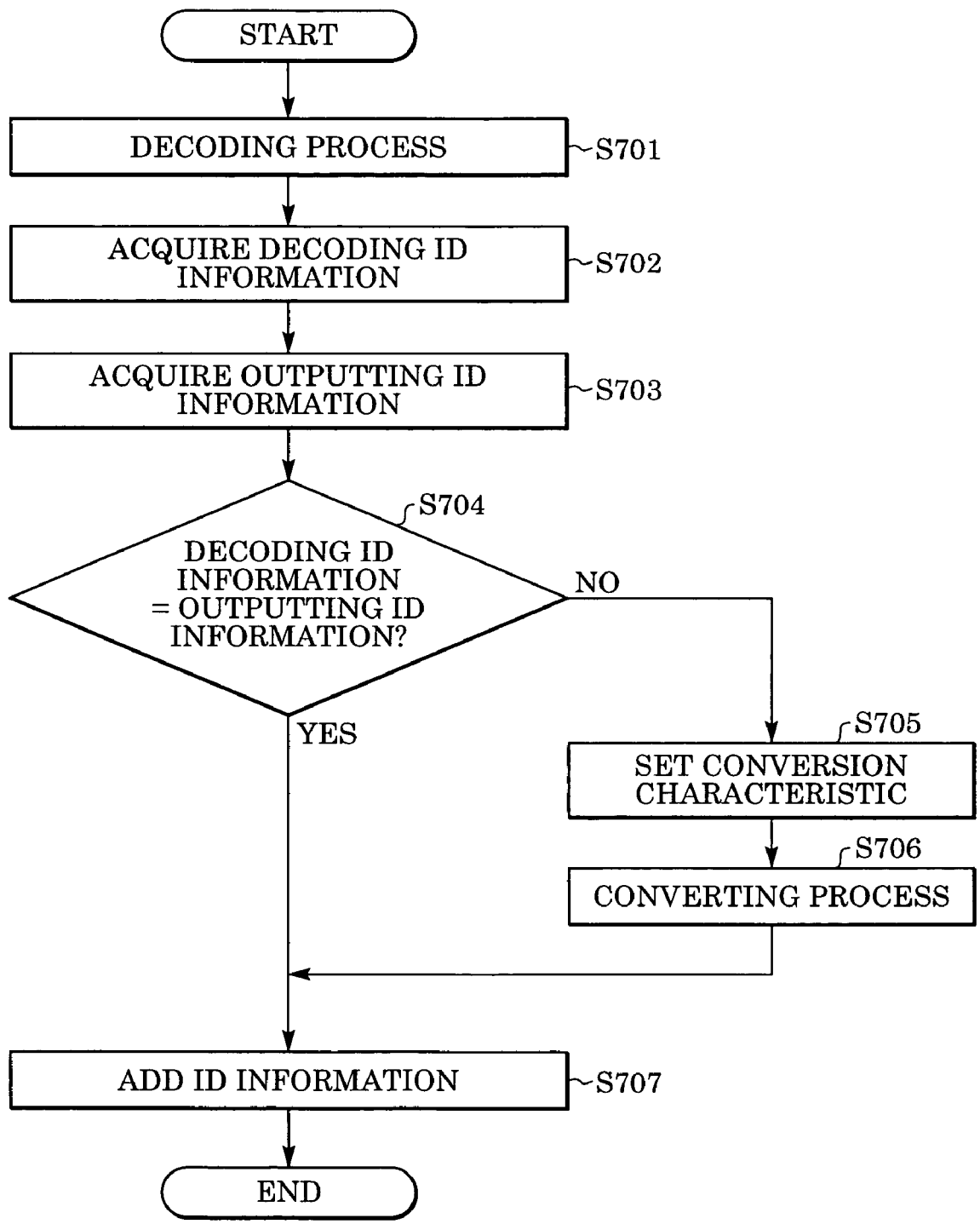
FIG. 7 is a flowchart illustrating a procedure of a decoding process in a first embodiment.

FIG. 7 is a flowchart illustrating a procedure of the decoding process in the first embodiment.

In step S701, the image signal reproduced by the media reproducing unit 107 is decoded by the decoder 108, and the processing proceeds to step S702. In step S702, the decoding ID information is acquired by the second ID detecting/converting unit 109, and the processing proceeds to step S703. In step S703, the ID information (in the following, referred to as "outputting ID information") which indicates the level range of the image signal when outputting to the display unit 111 is acquired, and the processing proceeds to step S704. The outputting ID information is pre-stored in the work memory (not shown).

In step S704, the decoding ID information is compared with the outputting ID information. If the decoding ID information matches the outputting ID information (yes in step S704), the processing proceeds to step S707. If the decoding ID information does not match the outputting ID information (no in step S704), the processing proceeds to step S705.

In step S705, the conversion characteristic for converting the level range of the decoding ID information to the level range of the outputting ID information is set, and the processing proceeds to step S706. The conversion characteristic may be set by a look-up table, or math processing. If a look-up table is used, the look-up table should be stored in the work memory beforehand. In step S706, a converting process of a level range of the decoded image signal is performed based on the conversion characteristic set in step S705, and the processing proceeds to step S707. The level range of the image signal of all scenes turns into the level range corresponding to the display unit 111 by the processing of step S707 (see FIG. 5C).

In step S707, as for the converted image signal, the ID information (in the following, referred to as "outputting ID information") is added to the header portion of the converted image signal, and the processing then ends. That is, in step S707, the converted image signal is output in correlation with the outputting ID information.

Thus, with the above-described processing, it is possible to have high quality outputting processing, without causing image quality deterioration.

In this embodiment, although the image signal is expressed in an unsigned 8-bit data format, the present invention is not limited to such a data length and data representation form. The data format which expresses a zero level with a mid-value may be sufficient as the image signal. In a system that needs gamma processing, a gamma correction may be simultaneously performed, at the time of the conversion processing of the level range, in consideration of a gamma characteristic. Also, in this embodiment, although there were three kinds of ID information, the present invention is not limited to this.

Also, in cases where the level range of the moving image signal is a predetermined constant level range and the level range of the still image signal is a predetermined constant level range, the first ID detecting/converting unit 102 may be made to correspond with a source identification flag for discriminating the moving image signal and the still image signal instead of the ID information.

In FIG. 1, for circuit reduction, the first ID detecting/converting unit 102 and the second ID detecting/converting unit 109, and the first ID adding unit and the second ID adding unit may include common circuits.

<Second Embodiment>

A second embodiment of the present invention is described below.

Figure 8:
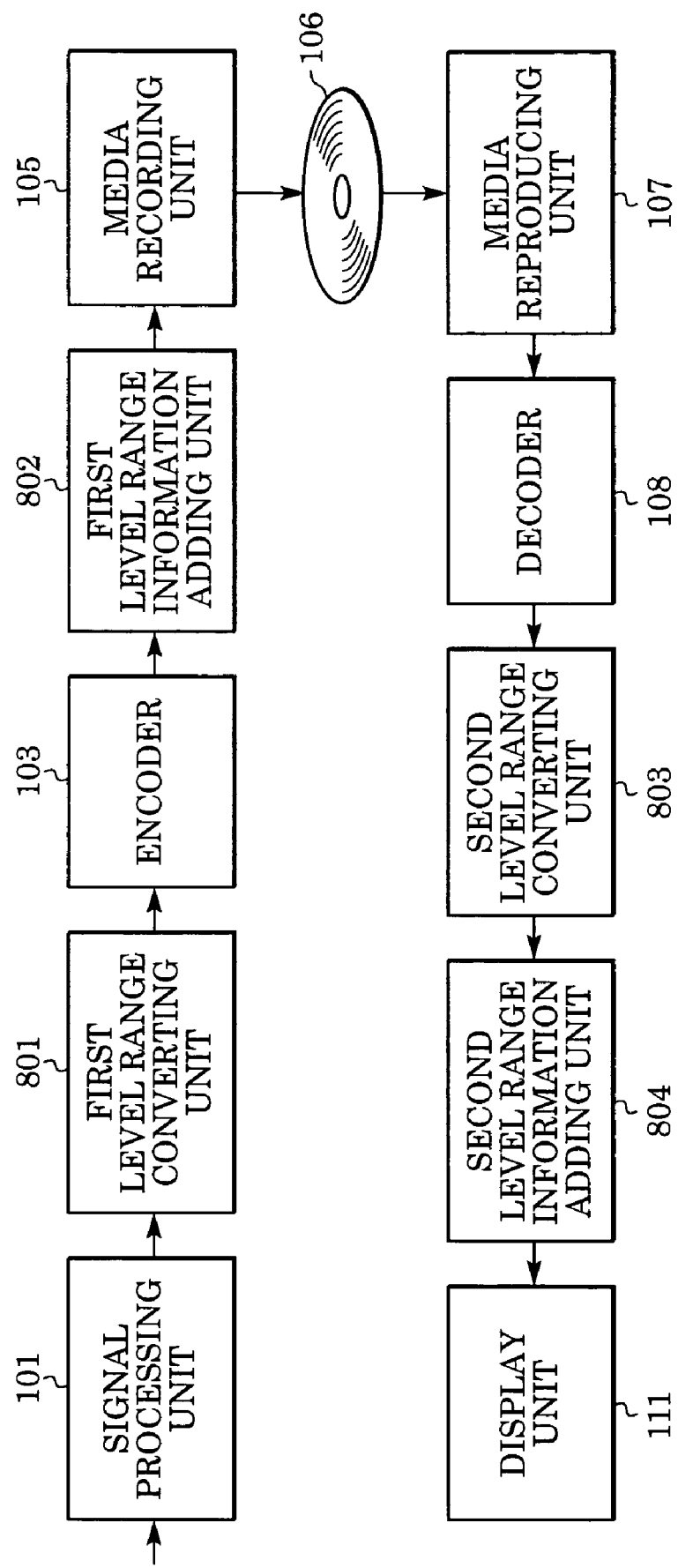
FIG. 8 is a block diagram of an image processing apparatus in a second embodiment of the present invention.

FIG. 8 is a block diagram of an image processing apparatus in a second embodiment of the present invention. Components of the second embodiment (shown in FIG. 8) that have the same function as components of the first embodiment (shown in FIG. 1 and described above) have the same reference number.

In the embodiment illustrated in FIG. 1, the level range of the image signal is discriminated by the ID information (described above). In this embodiment, the level information which indicates the white level and black level of the image signal is added to the image signal, and the level information is transmitted. The level range of the image signal is determined by the level information.

The image signal that should be recorded on recording medium 106 is input into signal processing unit 101 from an external apparatus. As described above, the signal processing unit 101 performs a color conversion (e.g., a publicly known general color conversion) process and a filtering (e.g., a publicly known general filtering) process to the image signal. The image signal processed by the signal processing unit 101 is input into a first level range converting unit 801. The first level range converting unit 801 detects level range information which indicates the white level range and black level range of the image signal processed by the signal processing unit 101. A level range of the image signal is determined based on the level range information. Then, the level range of the image signal is converted so that it may become the level range corresponding to a coding processing.

The image signal into which a level range was converted by the first level range converting unit 801 is input into an encoder 103. The encoder 103 encodes the image signal output from the first level range converting unit 801. A first level range information adding unit 802 adds the level range information which indicates the white level and black level converted by the first level range converting unit 801 to the image signal encoded by the encoder 103. For example, in cases where the first level range converting unit 801 converts a level range of the image signal into the black level=0 and white level=255, the first level range information adding unit 802 adds the level range information which indicates the black level=0 and white level=255, into the image signal encoded by the encoder 103.

A media recording unit 105 processes the image signal (including the level range information), which is output from the first level range information adding unit 802, to a recording format corresponding to a recording media 106 (such as an optical disk), and records the processed image signal on the recording medium 106. That is, the processed image signal is recorded on the recording medium 106 in correlation with the first level range information.

A reproducing operation is explained next. A media reproducing unit 107 reproduces the image signal recorded on the recording media 106, and outputs the image signal to a decoder 108. The decoder 108 decodes the reproduced image signal. The decoded image signal is input into a second level range converting unit 803.

The second level range converting unit 803 detects the level range information which indicates the white level and black level of the decoded image signal and converts, based on the detected level range information, the level range of the decoded image signal into the level range which suits a display unit 111.

The image signal in which the level range is converted by the second level range converting unit 803 is input into a second level range information adding unit 804. The second level range information adding unit 804 adds the level range information equivalent to the level range converted by the second level range converting unit 803 to the image signal, and outputs it to a display unit 111. For example, in cases where the second level range converting unit 803 converts the level range into the black level =15 and white level =250, the second level range information adding unit 804 adds the level range information which indicates the black level =15 and white level =250 to the image signal. Since the image signal of the level range optimized for the display unit 111 is input into the display unit 111, a high quality image is displayed on the display unit 111.

Figure 9:
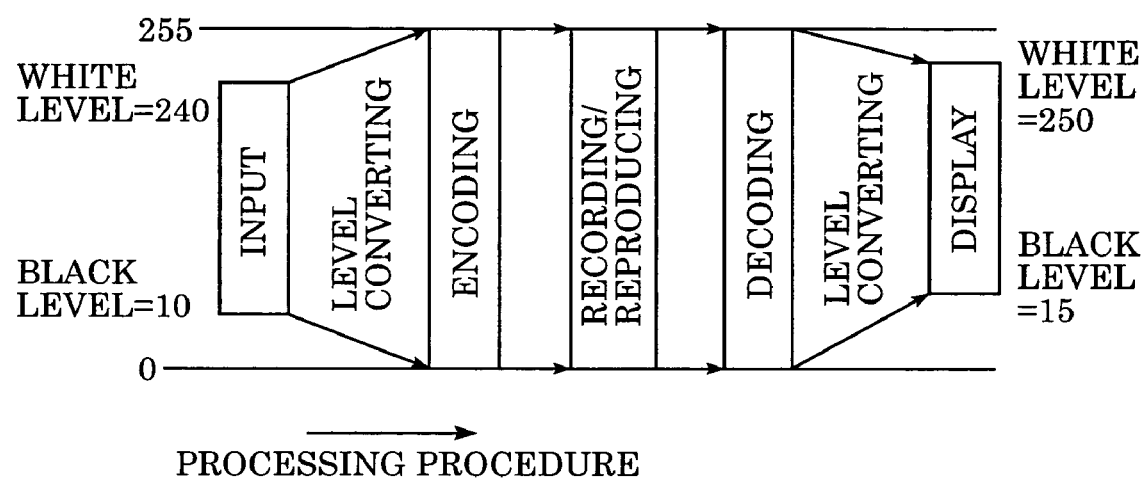
FIG. 9 illustrates a transition of a level range according to a processing procedure in a second embodiment.

FIG. 9 illustrates a transition of a level range according to a processing procedure in the second embodiment. In this example, the first level range converting unit 801 converts an inputting level range of the black level=10 and white level=240 into the level range of the black level=0 and white level=255. This conversion process is realized by the same technique as the above-described first embodiment. Then, an encoding process of the encoder 103; and a recording/reproducing process by the media recording unit 105, recording media 106 and media reproducing unit 107; and a decoding process of the decoder 108 are performed using the optimal dynamic range. The second level range converting unit 803 converts the level range of the reproduced image signal into the level range (the black level=15 and white level=250) of the display unit 111. By the above processing, the high quality image can be displayed using the display unit 111.

This embodiment can output high quality images without causing the difference of the image quality (e.g., the reduction of contrast or over-contrast) for the image signal of a plurality of scenes from which the level range of an image signal is different where the processing includes concatenation editing.

Figure 10:
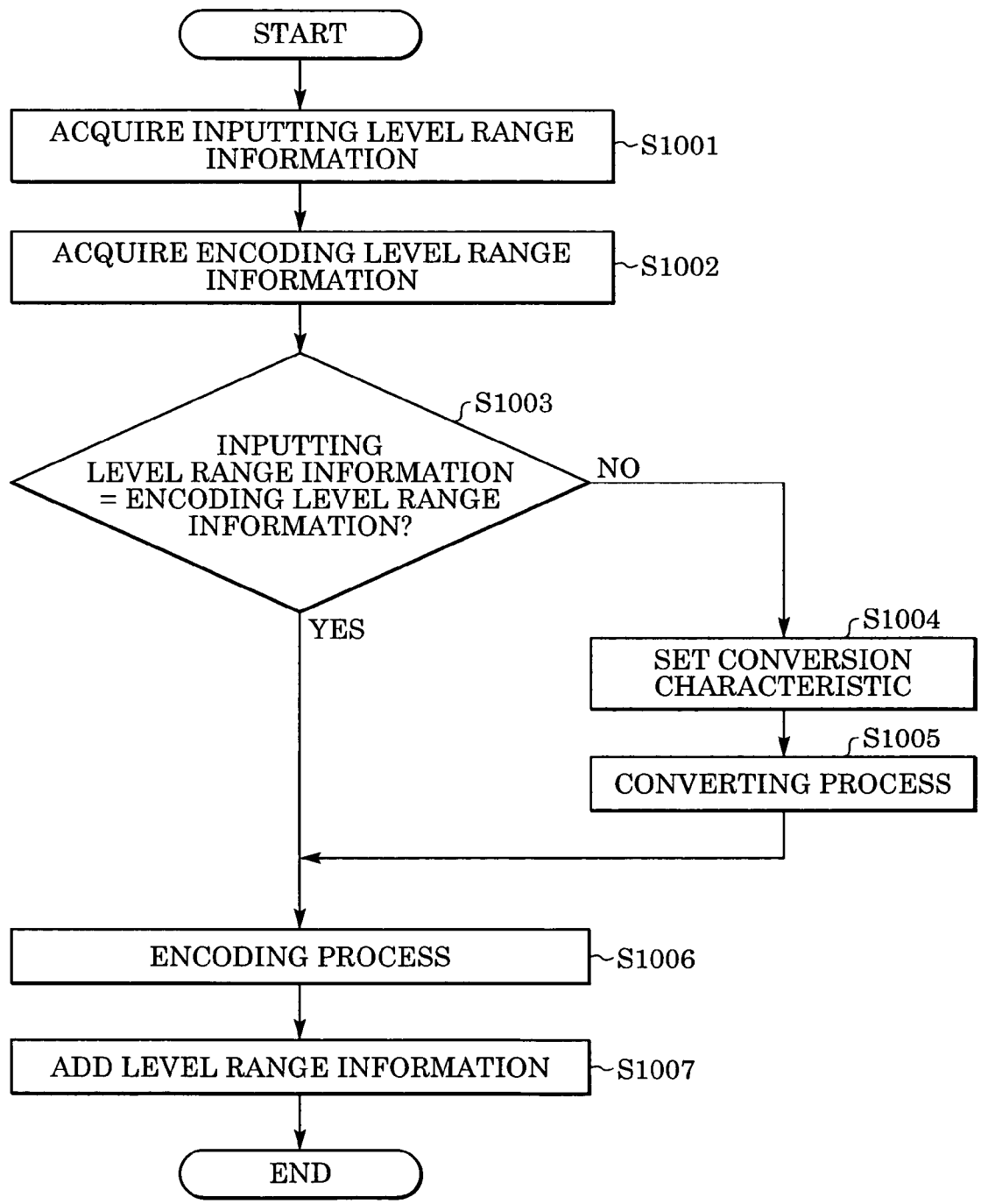
FIG. 10 is a flowchart illustrating a procedure of an encoding process in a second embodiment.

An encoding process of the second embodiment is described next with reference to the flowchart shown in FIG. 10.

In step S1001, the level range information (in the following, referred to as "inputting level range information") which indicates the white level and black level of the input image signal is acquired by the first level range converting unit 801, and the processing proceeds to step S1002. The level range information is stored in a header portion of the input image signal. In step S1002, the level range information (in the following, referred to as "encoding level range information") which indicates the white level and black level of the image signal when encoding is acquired, and the processing proceeds to step S1003. The encoding level range information is pre-stored in a work memory (not shown). In step S1003, the inputting level range information is compared with the encoding level range information. If the inputting level range information matches the coding level range information (yes in step S1003), the processing proceeds to step S1006. If the inputting level range information does not match the encoding level range information (no in step S1003), the processing proceeds to step S1004.

In step S1004, the conversion characteristic for converting the level range of the inputting level range information to the level range of the encoding level range information is set, and the processing proceeds to step S1005. The conversion characteristic may be set up by a look-up table, or by math processing. In the case of a look-up table, the look-up table should be pre-stored in the work memory. In step S1005, a converting process of the level range of the inputting image signal is performed according to the conversion characteristic set in step S1004, and the processing proceeds to step S1006. The level range of the image signal of all scenes turns into the level range corresponding to the encoding process in step S1005.

In step S1006, the converted image signal is encoded by a predetermined compression-encoding method (e.g., MPEG-2, Motion JPEG, etc.), and the processing proceeds to step S1007. In step S1007, as for the encoded image signal, the level range information (in the following, referred to as "decoding level range information" and the decoding level range information is the same information as the encoding level range information) is added to the header portion of the encoded image signal, and the processing then ends. That is, in step S1007, the encoded image signal is output in correlation with the decoding level range information.

It is possible to have high quality encoding processing, without causing the image quality deterioration with the above-described processing.

Figure 11:
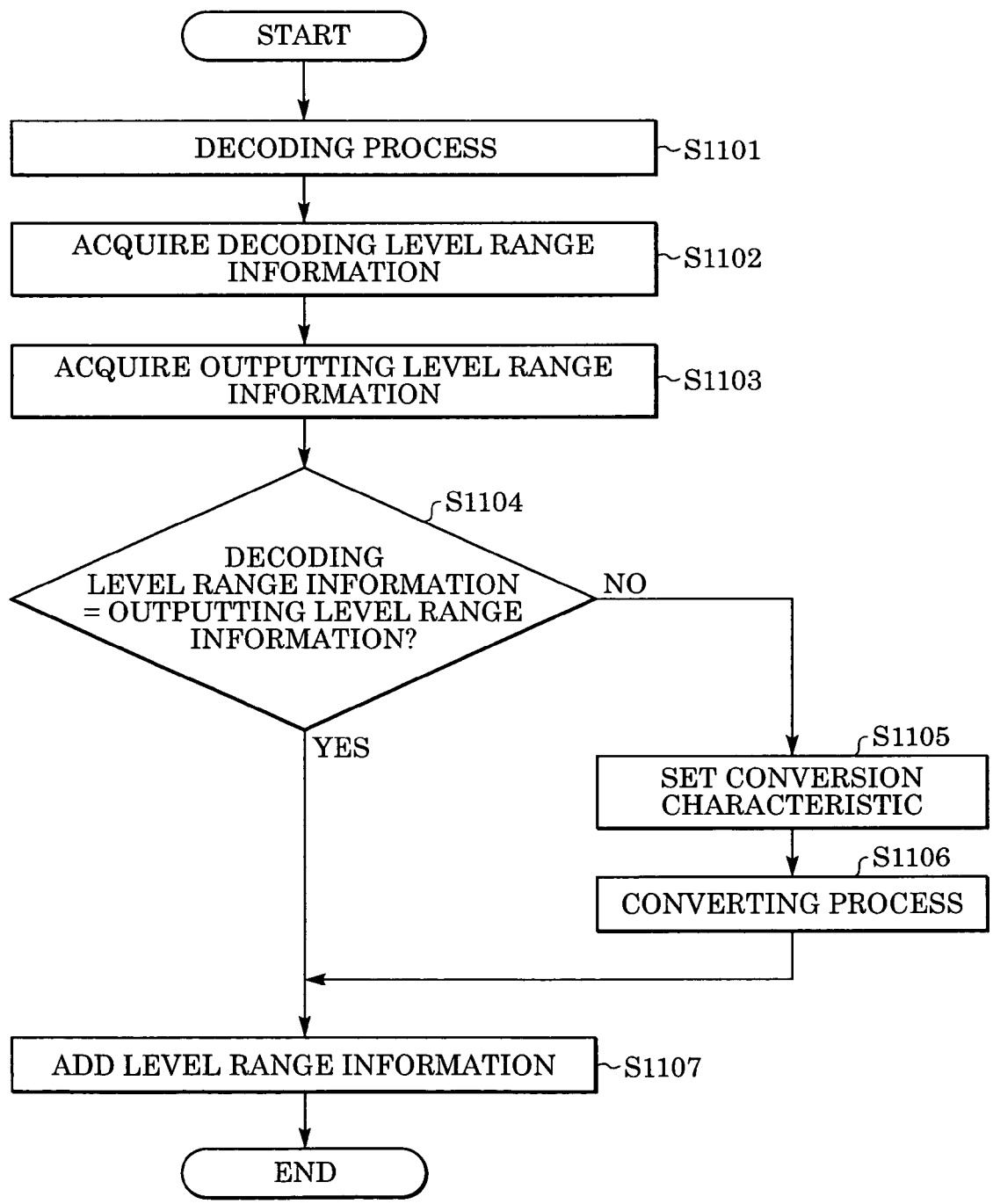
FIG. 11 is a flowchart illustrating a procedure of a decoding process in a second embodiment.

A decoding process of the second embodiment is described below with reference to the flowchart shown in FIG. 11.

In step S1101, the image signal reproduced by the media reproducing unit 107 is decoded by the decoder 108, and the processing proceeds to step S1102. In step S1102, the decoding level range information is acquired by the second level range converting unit 803, and the processing proceeds to step S1103. In step S1103, the level range information (in the following, it is referred to as "outputting level range information") which indicates the level range of the image signal when outputting to the display unit 111 is acquired, and the processing proceeds to step S1104. The outputting level range information is pre-stored in the work memory (not shown).

In step S1104, the decoding level range information is compared with the outputting level range information. If the decoding level range information matches the outputting level range information (yes in step S1104), the processing proceeds to step S1107. If the decoding level range information does not match the coding level range information (no in step S1104), the processing proceeds to step S1105.

In step S1105, the conversion characteristic for converting the level range of the decoding level range information to the level range of the outputting level range information is set, and the processing proceeds to step S1106. The conversion characteristic may be set by a look-up table, or math processing. If a look-up table is used, the look-up table should be pre-stored in the work memory. In step S1106, a converting process of the level range of the decoded image signal is performed based on the conversion characteristic set in step S1105, and the processing proceeds to step S1107. The level range of the image signal of all scenes turns into the level range corresponding to the display unit 111 by the processing of step S1107.

In step S1107, as for the converted image signal, the level range information (in the following, it is referred to as "outputting level range information") is added to the header portion of the converted image signal, and the processing then ends. That is, in step S1107, the converted image signal is output in correlation with the outputting level range information.

It is possible to have high quality outputting processing, without causing the image quality deterioration by the above-described processing.

In this embodiment, although the image signal is expressed in an unsigned 8-bit data format, the present invention is not limited to such a data length and data representation form. The data format which expresses a zero level with a mid-level value may be sufficient as the image signal. In a system that needs gamma processing, a gamma correction may be simultaneously performed, at the time of the conversion processing of the level range, in consideration of a gamma characteristic. Also, in this embodiment, although there were three kinds of level range information, the present invention is not limited to this.

This embodiment illustrates the level range information of the image signal by using the information of the white level and black level. However, the present invention is not limited to the white level and black level. The other information may be sufficient as long as it is information that can determine a level range of an image signal (e.g., information which indicates the white level and a mid-level between the white level and black level, or the black level and the mid-level).

<Other Embodiments>

In the above-described embodiment, although decoding process is performed after coding, this invention can be also applied in cases where coding process is performed after decoding (e.g., at the time of edit of the encoding data).

A storage medium storing program code may be provided for performing the above-described processes to an image sensing system or apparatus, reading the program code, by a CPU (central processing unit) or MPU (micro processing unit) of the image sensing system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, a CD-ROM (compact disk—read-only memory), a CD-R (CD-recordable), a magnetic tape, a non-volatile type memory card, and a ROM, and a computer network, such as a LAN (local area network) and a WAN (wide area network), can be used for providing the program code.

Furthermore, embodiments of the invention may include an OS (operating system) or the like working on the computer which perform a part or entire processes in accordance with designations of the program code and realize functions according to the above embodiments.

Furthermore, the present invention also includes a case where, after the program code read from the storage medium are written in a function expansion card which is inserted into the image sensing system or apparatus or in a memory provided in a function expansion unit which is connected to the image sensing system or apparatus, CPU or the like contained in the function expansion card or unit performs a part or entire process in accordance with designations of the program code and realizes functions of the above embodiments.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims the benefit of Japanese Patent Laid-Open No. 2004-185977, filed Jun. 24, 2004, which is hereby incorporated by reference herein.

What is claimed is:

1. A method of processing an image signal with an image processing apparatus that includes a signal processing unit, the method comprising steps of:
   receiving, at the signal processing unit, an input image signal to which first identification information indicative of a level range of each scene in the input image signal is added;
   detecting the first identification information and determining the level range of each scene in the input image signal;
   converting the level range of each scene of the input image signal into a first predetermined level range in accordance with the first identification information and second identification information which corresponds to a level range of the image processing apparatus;
   adding the second identification information to each scene of the converted image signal so that the second identification information indicates the first predetermined level range of each scene in the converted image signal; and
   outputting the converted image signal and the second identification information added thereto,
   wherein the first and second identification information include information indicating at least one of the level range and a source identification flag which is used by the signal processing unit with respect to each scene of the input image signal.

2. The method according to claim 1, further comprising:
   encoding the converted image signal;
   recording the encoded image signal and the second identification information output on a recording medium, the second identification information being correlated with the encoded image signal;
   reproducing the encoded image signal and the second identification information from the recording medium;
   decoding the reproduced image signal;
   converting the level range of the decoded image signal into a second predetermined level range in accordance with third identification information; and
   outputting the converted image signal of the second predetermined level range and the third identification information which indicates the second predetermined level range.

3. A non-transitory computer readable storage medium storing therein a computer program executable by a computer to perform the image processing method according to claim 1.

4. The method according to claim 1, wherein the source identification flag discriminates whether each scene of the input image signal corresponds to a moving image signal or a still image signal.

5. An image processing apparatus comprising:
- an input unit arranged to receive an input image signal to which first identification information indicative of a level range of each scene in the input image signal is added;
- a detecting unit arranged to detect the first identification information and determine the level range of each scene in the input image signal;
- a first converting unit arranged to convert the level range of each scene of the input image signal into a first predetermined level range in accordance with the first identification information and second identification information which corresponds to a level range of the image processing apparatus;
- an identification information adding unit arranged to add the second identification information to each scene of the converted image signal so that the second identification information indicates the first predetermined level range of each scene in the converted image signal; and
- a first outputting unit arranged to output the converted image signal and the second identification information added thereto,
- wherein the first and second identification information include information indicating at least one of the level range and a source identification flag which is used by the signal processing unit with respect to each scene of the input image signal.

6. An image processing apparatus according to claim 5, further comprising:
- an encoder arranged to encode the converted image signal;
- a recording unit arranged to record the encoded image signal and the second identification information output on a recording medium, the second identification information being correlated with the encoded image signal;
- a reproducing unit arranged to reproduce the image signal and the second identification information from the recording medium;
- a decoder arranged to decode the reproduced image signal;
- a second converting unit arranged to convert the level range of the decoded image signal into a second predetermined level range in accordance with a third identification information; and
- a second outputting unit arranged to output the converted image signal converted by the second converting unit and the third identification information which indicates the second predetermined level range.

7. The apparatus according to claim 5, wherein the source identification flag discriminates whether each scene of the input image signal corresponds to a moving image signal or a still image signal.

* * * * *